No. 653,252. Patented July 10, 1900.
C. F., A. L. & A. W. LAWTON.
TILE.
(Application filed Apr. 24, 1899.)
(No Model.)
Fig. 1.
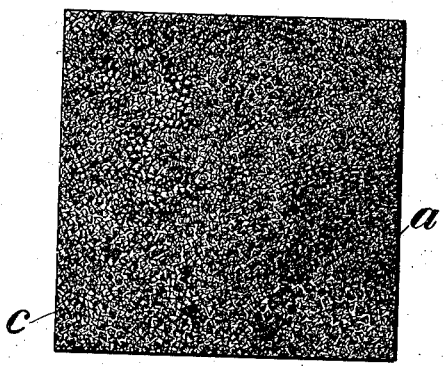
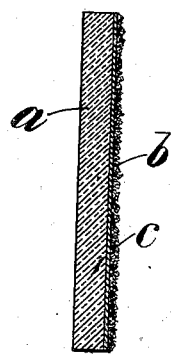
Fig. 2.
Witnesses
John H. Hall
Gustave R. Thompson
Inventors.
C. F. Lawton.
A. L. Lawton.
A. W. Lawton
by Wilkinson & Fisher Attorneys.

UNITED STATES PATENT OFFICE.

CHARLES F. LAWTON, ALBERT L. LAWTON, AND ARTHUR W. LAWTON, OF NEW YORK, N. Y.

TILE.

SPECIFICATION forming part of Letters Patent No. 653,252, dated July 10, 1900.

Application filed April 24, 1899. Serial No. 714,332. (No model.)

*To all whom it may concern:*

Be it known that we, CHARLES F. LAWTON, ALBERT L. LAWTON, and ARTHUR W. LAWTON, citizens of the United States, residing at New York, borough of Brooklyn, and State of New York, have invented certain new and useful Improvements in Tiles; and we do hereby declare the following to be a full, clear, and exact description of the invention, such as will enable others skilled in the art to which it appertains to make and use the same.

This invention relates to tiles.

The object is the production of economical tiles which will firmly adhere to the surfaces on which they are placed.

The present invention is strongly to be distinguished from performances in which the substance to form the bond between the tile and any superimposed matter is in the nature of or is in effect a flux—that is to say, a substance which has to be fused in order to make it effective—inasmuch as the bond of the present invention simply requires drying in the air and then heating to a temperature far below that of fluxing, when it (the bond for holding the granulous matter) becomes of flinty hardness and totally insoluble toward water or any other liquids with which it is ever likely to be brought into contact. A marked advantage of obviation of the necessity for fluxing or fusion is that where a substance has to be fused in order to give it in this art the proper function of a bond between the tile and superimposed granular matter the fluxing of the bond substance causes the same to creep up in the form of smooth-surfaced cones around each granular particle, thus covering their irregularities and angles, and so in a large degree depriving the granular matter particle by particle of its retentive or holding quality to the Portland or other cement or material which holds the tile to the wall or ceiling. The granulous matter thus attached to the tile can then scarcely be said, properly speaking, to be fully of the nature of retaining-points.

Another very important feature of our invention, where economy in cost of manufacture is considered, is that thereby the tiles can be packed close together horizontal, perpendicular, or inclined in the oven where the cement holding the granular matter to the tile is to be made insoluble by heating, and as this heating is to a temperature far below that of fluxing there is not the slightest danger of the tiles sticking together nor of the cement flowing or creeping under the influence of the heat. When any considerable time is to elapse between when the tiles are made and the time when they are to be applied to the walls or ceilings, the heating may be entirely dispensed with, as the cement holding the granulous matter on their backs will slowly become insoluble by time alone.

In the accompanying drawings, in which similar parts are represented by similar letters, Figure 1 represents a plan view of the back of a tile embodying our invention, and Fig. 2 a central cross-sectional view thereof.

In practicing our invention we proceed as follows: To begin with, we take any common insoluble glass—such, for instance, as common window-glass, scrap, or refuse trimmings—which is in chemical composition mainly a double silicate of lime and soda, and this glass is reduced to a coarse powder for convenience of mixing and which powder we will call "No. 1." Should an opaque white tile be wanted made of common window-glass, (not powdered or scrap glass,) to fifty pounds of No. 1 we add thirty pounds of tribasic calcium phosphate, five pounds of tin oxid, and fifteen pounds of cryolite. These ingredients we mix and then fuse together in a crucible until the mixture forms a perfectly-even homogeneous glass, which is then poured out and after cooling ground to a very fine powder, which we will call "No. 2." Now mix fifty pounds of No. 2 with fifty pounds of a syrupy solution of silicate of potash or silicate of soda, or, if a more fluid cement is desired, use seventy pounds of the syrupy alkaline-silicate solution to fifty pounds of No. 2 and then grind the mixture through a paint-mill, the grinding-surfaces of which are made of hard porcelain or white stoneware. This will produce a fine opaque white liquid cement, in which the parts in solution are dissolved in water. Next lay a large sheet of common window-glass, single or double thick, on a light wooden frame resting horizontally on a bench or table, and to the upturned face of this glass apply some of the liquid cement by pouring a small quantity of it on the center of the glass, and then with a straight rubber-edged tool about a foot long with a handle in the middle spread the liquid cement evenly over the entire face of the glass, and while the cement is still wet pour dry sand or powdered rock over the entire surface of the cement, and then by means of the light wooden frame on which the glass rests raise the glass to a nearly-perpendicular position, so as to pour off the surplus of dry sand, and then set the glass aside to dry in the air. After the sheets of glass so treated are dried enough to harden the cement, which will be in about one hour's time in the air of a room having a temperature of about 70° Fahrenheit, the sheets of glass are ready to be cut into tiles of any shape or size desired. These tiles so produced are then piled into an oven in a horizontal, perpendicular, or inclined position, and to save room in the oven packed as close together as they (the tiles) will lie or stand, the sand cemented to their backs making space enough between the tiles, so that the heat will penetrate to every part. After the oven is filled with the tiles and the door closed the heat is very gradually applied and raised during a period of from two to six hours, according to the size of the oven and the number of tiles it contains, until the temperature in the oven is about 360° Fahrenheit. The heat is then held at this temperature from one to three hours and then the heat shut off and the oven closed tight and allowed to cool very gradually for, say, five hours. This gradual heating and cooling of the tiles, besides making the cement insoluble, anneals the glass, so as to make it tougher. After the tiles have been cooled and removed from the oven they are ready to be packed for shipment to the places where used.

A tile made according to the above process is shown in the drawings, in which $a$ represents the glass front, $b$ the cement, and $c$ the granular substance spread over the surface of the back.

The white color of the cement on the backs of the transparent glass tiles shows through to the front, giving them when in place on the wall or ceiling the appearance of white enameled porcelain. When the cement used is of thin consistence, as when it is compounded of fifty parts of No. 2 and seventy parts of alkaline-silicate solution, then to prevent the sand which is applied to the back of the tile from sinking through the fresh wet cement to the surface of the glass, and thus showing through the glass from the front, two coats of this thin cement should be applied before the sand is poured on, the first coat of cement being allowed to dry half an hour before the application of the second coat of cement, which second coat of cement is the one which holds the sand in place after the latter is sifted on. Variations in the color and general appearance of the tiles can be produced by letting a portion of the sand sink through the cement, so as to be seen through the glass from the front, and if the sand is of various colors it can be poured onto the soft cement in streaks, patches, and curves of one or several colors, thus producing a variegated appearance when seen through the glass from the front. Of course the white cement can be tinted to pink, white, bluish white, greenish white, &c., by additions of small quantities of tinting materials to the cement.

Should transparent glass tiles having a blue appearance be wanted, then the No. 2 is made thus: Fifty pounds of No. 1 is mixed and fused with thirty pounds of oxid of lead, twenty of caustic soda, and two of oxid of cobalt and the fused mixture cooled, ground to fine powder, and mixed and ground with the alkaline-silicate solution, the same as is the white cement. For a green cement to fifty parts of No. 1 is added twenty parts oxid of copper, twenty of carbonate of soda, and ten oxid of lead, the mixture fused, ground fine, and then ground with the alkaline-silicate solution, as and in about the same proportions as with the white cement. For an orange-colored cement to fifty parts of No. 1 add forty parts oxid of lead, five dried ferric sulfate, and five oxid of antimony, fuse, and proceed as before. For a red color to fifty parts No. 1 add thirty parts suboxid of copper and twenty oxid of lead. Fuse, grind, and mix, as before.

Where a porcelain, metal, or coarse earthenware tile is to have a rough back or sand cemented to its rear or face, then the white cement first described can be used.

It will be understood that a tile or other object to be used in ornamental or other construction and completed according to our invention is to be set in place in Portland or other suitable cement or plastic matter with the granular matter previously cemented to the tile or other object presenting retaining-points set into the Portland or other cement.

We claim—

1. A tile having retaining-points attached to it by a cement solution hardened by drying and rendered insoluble by drying and exposure, or by drying and heating to a temperature below that of fusion, substantially as described.

2. A slab or piece of glass, porcelain, or metal, having retaining-points consisting of finely-broken glass, finely-divided rock, or sand, fixed to it by a cement solution, which becomes hard by drying, and is rendered insoluble by drying and exposure, or by drying and heating to a temperature below fusion, and which unites both with the tile and with the retaining-points, forming an inseparable bond.

3. A slab or piece of glass, having a backing of a cement solution, containing an alkaline silicate, holding color, and thereon a granular back, presenting retaining-points, the cement being insoluble and firmly holding the retaining-points to the glass, whereby the tile will present color by the color showing through from the back to the front of the tile, and the glass will, at once, be provided with retaining-points for holding it in place when set, substantially as described.

4. A tile made of glass, porcelain, metal or terra-cotta having retaining-points of fine granular matter attached to the back of the tile by means of a compound cement made of a water solution of a soluble silicate compounded with insoluble silicate in a state of fine division, the whole forming a tile with a finely-granulous back which becomes unaffected by water by simply drying and then heating to a temperature below fusion.

In testimony whereof we affix our signatures in presence of two witnesses.

CHARLES F. LAWTON.
    ALBERT L. LAWTON.
    ARTHUR W. LAWTON.

Witnesses:
  MARSENUS H. BRIGGS,
  JAMES A. BOLTON.